M. D. CAMPBELL.
POWER TRANSMISSION BELT.
APPLICATION FILED JAN. 31, 1916.

1,228,528.

Patented June 5, 1917.

UNITED STATES PATENT OFFICE.

MILTON D. CAMPBELL, OF CINCINNATI, OHIO, ASSIGNOR TO THE PERKINS CAMPBELL COMPANY, OF CINCINNATI, OHIO, A CORPORATION OF OHIO.

POWER-TRANSMISSION BELT.

1,228,528.

Specification of Letters Patent.   Patented June 5, 1917.

Application filed January 31, 1916.   Serial No. 75,227.

*To all whom it may concern:*

Be it known that I, MILTON D. CAMPBELL, a citizen of the United States of America, and resident of Cincinnati, county of Hamilton, State of Ohio, have invented certain new and useful Improvements in Power-Transmission Belts, of which the following is a specification.

This invention relates to improvements in power transmission belts and particularly to the short belts employed in automobile construction for driving fans and generators.

Heretofore the belts employed for driving the fans and generators of automobiles, have been made either entirely of leather or of fabric webbing. Both of these materials because of certain of their inherent properties, are objectionable in many respects, especially when applied to pulleys of short radius and spaced a short distance apart.

One of the principal objections is that leather belts will stretch and thus destroy their usefulness for driving, while fabric webbing belts, although not as liable to become stretched as those made of leather, have to be especially prepared to close the interstices of the fabric to prevent air from entering between them and the pulleys and thereby breaking the vacuum which causes the belt to cling to the pulley. In due time, this preparation whether it be on the surface or whether it be infused into the fabric, will either become worn off or will crack and open up small passages through which the air may pass to the pulley and thus destroy the clinging quality of the belt.

In order to overcome these objections I have devised the belt herein illustrated and described, in which an object is to produce a belt especially adapted to use as an automobile fan or generator belt which will not stretch, and which will not be detrimentally affected by moisture and other deteriorating influences.

A further object is to produce a belt which will grip the pulley surfaces as readily as the belts heretofore employed without the liability of having its gripping quality impaired through use.

These and other objects are attained in the belt described in the following specification and illustrated in the accompanying drawings in which.

Figure 1:
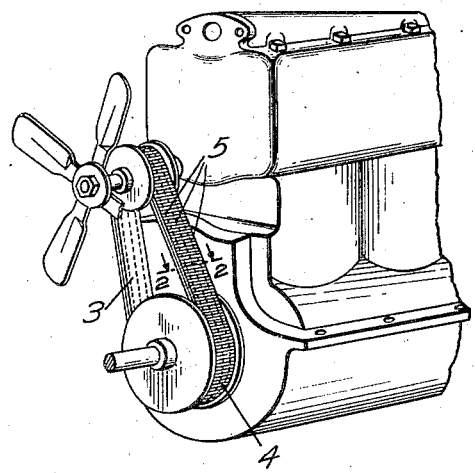
Figure 1 is a fragmentary perspective view of an automobile engine having a fan belt embodying my invention applied thereto.
Figure 2:
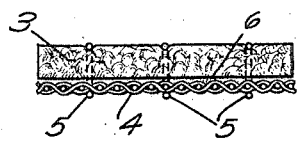
Fig. 2 is a sectional view taken on the line 2—2 of Fig. 1.

The belt embodying my invention consists of inner and outer layers or laminæ 3 and 4, the inner lamina 3 being of leather, and the outer lamina 4 being of fabric webbing. The two laminæ are sewed together and vulcanized, the process of vulcanization being that commonly known as acid vulcanizing, by means of which the fabric is bonded with the leather so that in addition to the several rows of stitching 5, the fabric is securely joined to the surface of the leather by means of the acid vulcanizing 6, shown in Fig. 2. The fabric in itself, previous to attaching to the leather of the belt, is especially prepared, it being thoroughly stretched and held in a stretched position for a long time, until the threads of fabric have become set and incapable of again returning to their original unstretched positions. In addition to this stretching the fabric is carefully treated to render it waterproof, so that when it is secured to the leather portion of the belt, it will not be subjected to the shrinking influences of moisture which may come in contact with it.

It will thus be seen that in my improved belt I have provided a construction in which neither the fabric webbing nor the leather can stretch, but which possesses the desirable features of both materials. The fabric webbing prevents the leather from stretching and in itself forms a reinforcement for the leather, with absolutely no space between it and the leather for harboring moisture, grease, or other deteriorating or otherwise objectionable elements. In addition to this the leather is brought next to the pulley surfaces so that the vacuum created by the belt as it hugs the pulley surfaces, will not be broken by air passing through the belt from the outside. It is preferable to run the belt with the leather side in contact with the pulleys since the leather is smooth and therefore creates a better vacuum and hence a better grip upon the pulley. Because of the vulcanization of the webbing to the leather it is impossible for the leather to become separated from the webbing, especially in view of the fact that the webbing is stitched to the leather in a series of parallel rows, which is in itself a great aid in retaining the leather and webbing in proper position with one another. The waterproofing of the webbing is another feature of advantage, since the belt will shed all water which may drip upon it and thereby protect the leather from its detrimental influences.

Having thus described my invention, what I claim is;

1. A laminated power transmission belt comprising an inner lamina of leather, and an outer lamina of stretched and water proofed fabric webbing sewed and vulcanized to the leather lamina.

2. In a laminated power transmission belt the combination of an inner lamina of leather, and an outer lamina of stretched fabric webbing sewed and vulcanized to the leather lamina.

3. In combination in a power transmission belt an inner lamina of leather, and an outer lamina of stretched fabric webbing sewed to the leather lamina.

In testimony whereof, I have hereunto subscribed my name this 29th day of January, 1916.

MILTON D. CAMPBELL.

Witnesses:
WALTER F. MURRAY,
W. THORNTON BOGERT.